United States Patent
Yotou et al.

(10) Patent No.: US 7,922,994 B2
(45) Date of Patent: Apr. 12, 2011

(54) METHOD FOR PREPARING METAL OXIDE PARTICLES WITH A CONTROLLED SIZE

(75) Inventors: Hiroaki Yotou, Kariya (JP); Miho Itoh, Aichi-ken (JP)

(73) Assignee: Denso Corporation, Kariya (JP)

( * ) Notice: Subject to any disclaimer, the term of this patent is extended or adjusted under 35 U.S.C. 154(b) by 112 days.

(21) Appl. No.: 12/317,047

(22) Filed: Dec. 18, 2008

(65) Prior Publication Data

US 2009/0162274 A1    Jun. 25, 2009

(30) Foreign Application Priority Data

Dec. 25, 2007   (JP) ................................ 2007-331937

(51) Int. Cl.
| | |
|---|---|
| C01B 13/00 | (2006.01) |
| C01B 13/36 | (2006.01) |
| C01F 7/00 | (2006.01) |
| C01F 7/34 | (2006.01) |

(52) U.S. Cl. ........................................ 423/592.1; 423/1
(58) Field of Classification Search .................. 423/631, 423/639, 643

See application file for complete search history.

(56) References Cited

U.S. PATENT DOCUMENTS

| 2003/0183806 | A1* | 10/2003 | Lyons | ..................... 252/301.4 F |
| 2005/0279969 | A1* | 12/2005 | Comanzo et al. | ...... 252/301.4 R |

FOREIGN PATENT DOCUMENTS

| JP | 2001-348223 | 12/2001 |
| JP | 2006-103983 | 4/2006 |
| JP | 2006-103984 | 4/2006 |
| JP | 2007-136339 | 6/2007 |
| JP | 2008-019106 | 1/2008 |

OTHER PUBLICATIONS

Office action dated Dec. 22, 2009 in corresponding Japanese Application No. 2007-331937.

* cited by examiner

*Primary Examiner* — Jerry Lorengo
*Assistant Examiner* — Jared Wood
(74) *Attorney, Agent, or Firm* — Harness, Dickey & Pierce, P.L.C.

(57) ABSTRACT

A method for preparing metal oxide particles having a primary particle size on the order of nanometers is provided. The method comprises subjecting a metal ion present in an aqueous solution and an amino alcohol to an initial stage of reaction with each other at normal temperatures under normal pressures for a given time, and adding at least once either of a metal ion or an amino alcohol or both thereof to the resulting reaction system for carrying out a subsequent stage of reaction for a given time wherein total amounts of the metal ion and the amino alcohol are such that the amino alcohol is used in the range of not less than a molar equivalent to the metal ion.

5 Claims, No Drawings

METHOD FOR PREPARING METAL OXIDE PARTICLES WITH A CONTROLLED SIZE

CROSS-REFERENCE TO RELATED APPLICATION

This application is related to Japanese Patent Application No. 2007-331937 filed on Dec. 25, 2007, the contents of which are hereby incorporated by reference.

BACKGROUND OF THE INVENTION

Field of the Invention

This invention relates to a method for preparing metal oxide particles having a primary particle size on the order of nanometers. The metal oxide particles are particularly suitable for use, for example, as a promoter for automotive exhaust gases or an optical catalyst for air cleaning.

Metal oxide particles have wide utility in various fields, for example, of automotive catalysts wherein cerium oxide or a cerium oxide/zirconium oxide solid solution is employed as promoting particles and also of air cleaning wherein titanium oxide is used (see, for example, Japanese Laid-open Patent Application No. 2001-348223). Such metal oxide particles are prepared according to a variety of methods including solid phase methods, liquid phase methods and vapor phase methods (see Japanese Laid-open Patent Application No. 2001-348223).

In recent years, it has become apparent that when particles are finely divided into those particles whose crystal size, i.e. a primary size, is made on the order of nanometers, such an effect (nanosize effect) as will not be observed for bulk bodies is developed. It has been accepted that there is the possibility that high additional values are achieved when metal oxides are converted to nanosized ones.

In conventional methods of preparing metal oxide particles, it is necessary to calcine a precursor at high temperatures or to treat it under high pressures. This makes it difficult to prepare metal oxide particles on the order of nanometers.

More particularly, according to a solid phase method, an oxide precursor is calcined at temperatures of not lower than 500° C. to provide a metal oxide. High temperature calcination is essential and thus, crystals are allowed to grow, so that the particle size of the metal oxide becomes on the order of micrometers. Thus, it has been difficult to cause the nanosize effect to be developed.

In conventional liquid phase methods, a reaction starts from a state where metal ions are dispersed in a solution, for which preparation of particles having a smaller size than in the solid phase method are possible. Nevertheless, with a co-precipitation method, for example, the size of the resulting metal oxide particles may become as large as on the order of micrometers, or the resulting metal oxide particles become clumped. Thus, a difficulty has been involved in producing metal oxide particles on the order of nanometers.

On the other hand, with a vapor phase method, most ideal nanoparticles of a metal oxide are very likely to be prepared, with many problems such as on productivity. Moreover, once formed nanoparticles strongly tend toward secondary coagulation. For example, a problem has been arisen in that dispersion of nanoparticles prepared in a vapor phase condition in a solvent leads to a problem of secondary coagulation.

Although there is a means for disintegrating secondary coagulated particles prepared by these conventional methods, problems are involved in that it is difficult to break the particles into finer pieces whose size is below a primary particle size when the coagulated particles have once undergone crystal growth. Another problem is that if a small primary particle size is attained, such particles are obtained as a result of an increasing number of preparation steps and that a desired particle size is difficult to obtain.

SUMMARY OF THE INVENTION

It is accordingly an object of the invention to provide a method for preparing metal oxide particles at normal temperatures under normal pressures wherein the particles have a primary particle size on the order of nanometers and can be prepared in a desired size.

In order to achieve the above object, there is provided A method for preparing metal oxide particles having a primary particle size on the order of nanometers, the method comprising subjecting a metal ion present in an aqueous solution and an amino alcohol to an initial stage of reaction with each other at normal temperatures under normal pressures for a given time, and adding at least once either of a metal ion or an amino alcohol or both thereof to the resulting reaction system for carrying out a subsequent stage of reaction for a given time wherein total amounts of the metal ion and the amino alcohol are such that the amino alcohol is used in the range of not less than a molar equivalent to the metal ion.

The invention has been accomplished based on the knowledge obtained from experimental tests made by us. According to the method of the invention, the resulting metal oxide particles can be prepared at normal temperatures under normal pressures as having an intended primary particle size on the order of nanometers. As stated above, the metal ion and the amino alcohol are reacted with each other in the initial stage of reaction wherein one of the metal ion and the amino alcohol may be added in an amount smaller than a total amount used throughout the reaction stages, or both ingredients may be used at a predetermined mixing ratio. More particularly, the amounts of the respective ingredients used in the initial reaction stage include three categories: (1) a metal ion is used in an amount smaller than a total amount to be used throughout reaction stages, which depends on the number of the reaction stages and a full or total amount of an amino alcohol is used in this initial stage; (2) an amino alcohol is used in an amount smaller than a total amount to be used throughout reaction stages, depending on the number of reaction stages, and a metal ion is used in a full total amount to be used throughout the reaction stages; and a metal ion and an amino alcohol are used at a predetermined mixing ratio in the initial and subsequent stages. With the cases (1) and (2), a metal ion or an amino alcohol alone is added to the resulting reaction solution for further reaction with the other ingredient in subsequent stages of reaction. In either case, once formed metal oxide particle can be further grown in the subsequent stages. More particularly, the reactions carried out in this way allow once formed metal oxide particles to be grown in a desired primary particle size on the order of nanometers. In the practice of the invention, at least two stages of the reaction including the initial stage are necessary. More particularly, such reactions may be repeated plural or several times, generally twice, three times or four times in maximum in view of economy.

The respective stages of the reaction are preferably continued at given time intervals, say, from 5 hours to 48 hours, preferably 10 to 24 hours. This time interval is necessary for conversion, in each stage, of the metal ion to a corresponding metal hydroxide by the action of the amino alcohol. The time intervals may be varied in the respective stages within the above defined range.

The reaction between a metal ion and an amino alcohol is repeated at least twice or several times by adding a portion of the metal ion to a predetermined amount of the amino alcohol, or adding a portion of the amino alcohol to a predetermined amount of the metal ion. In the former addition, the metal ion in the form of an aqueous solution is added to the amino alcohol, followed by further addition of a portion of the metal ion to the reaction solution at least once thereby forming metal oxide particles in the reaction solution. In this case, it is preferred that when the amino alcohol is added to the portion of the metal ion present in an aqueous solution, the pH of the resulting solution is at 8 or over, under which the metal ion is further added for a further stage of reaction after a given time interval. To attain the pH of 8 or over, the amino alcohol is added to the metal ion-containing aqueous solution in an amount of not less than one molar equivalent relative to the metal ion.

With the case where both a metal ion and an amino alcohol are reacted at a predetermined mixing ratio sufficient to allow substantially stoichiometric reaction therebetween in an initial stage of reaction for a given time, both ingredients of a similar mixing ratio are further added at least once to the resulting reaction solution in a subsequent stage of reaction for a given time. This further addition may be repeated plural times, if necessary.

BEST MODE FOR CARRYING OUT THE INVENTION

The preparation method according to this embodiment is a kind of co-precipitation and belongs to a liquid phase method wherein particles are prepared by a precipitation deposition method. This method is carried out at normal temperatures under normal pressures and is thus a very inexpensive preparation method in view of the fact that neither a heating source nor temperature control is necessary.

In the first step or stage of the preparation method of the invention, a metal ion and an amino alcohol are subjected to reaction with each other at normal temperatures under normal pressures. In this step, the reaction is carried out in such a way that the metal ion or amino alcohol is used at a portion thereof and the other ingredient is fully used in a predetermined amount. For convenience's sake, the category or case (1) set out hereinabove wherein a metal ion is initially provided at a portion thereof or in a smaller amount relative to a predetermined amount necessary for the reaction with the other ingredient, i.e. the metal ion is reacted with a predetermined amount of an amino alcohol, is illustrated. A starting metal compound for an intended metal oxide is initially dissolved in water so that the metal is present in the resulting aqueous solution as an ion. Thereafter, a predetermined amount of an amino alcohol, which is sufficient for reaction with a finally employed total amount of the metal ion, may be added to the aqueous solution of the metal compound at normal temperatures under normal pressures, or the aqueous solution may be added to the amino alcohol. By the addition, the reaction between the metal ion and the amino alcohol commences. This reaction is continued over a time of from 5 to 48 hours as set out before. In a next stage, the balance of the metal compound or ion in the form of an aqueous solution is further added to the reaction solution with or without division into several portions depending on the desired number of subsequent reaction stages. More particularly, the balance of the metal compound may be all added to the reaction solution at one time, or may be divided into portions, followed by addition of one of the portions to the reaction solution and subjecting to further reaction for a time as defined above and repeating these steps until all the portions are used up. In this connection, the total reaction stages including the initial stage is at least two in number and may be four in maximum in view of the economy being taken into account. According to the invention, such a procedure as stated above enables metal oxide particles to be formed in the reaction solution wherein the particles have desired primary particle size is on the order of nanometers suitable for practical applications. In the practice of the invention, it is preferred to provide metal oxide particles having a primary size of from 10 to 50 nanometers, and the primary size may be arbitrarily controlled depending on the number of reaction stages. More particularly, a greater number of reaction stages result in a larger primary size. After completion of the reaction, the metal oxide particles are separated from the reaction solution and rinsed with water, and may be further treated depending on the end use thereof as will be described later.

In this embodiment, an example wherein a metal ion is charged portion by portion to the amino alcohol at given time intervals has been illustrated. In contrast, an amino alcohol may be charged into an aqueous solution of a metal ion in several stages of reaction. In either case, once a metal ion derived from a metal compound and an amino alcohol are reacted with each other, after which a metal compound in the form of an aqueous solution or an amino alcohol is further charged into the reaction solution at least once.

According to this embodiment, a metal compound in the form of an aqueous solution containing a corresponding metal ion is not charged into an amino alcohol at one time, but the metal ion is charged into an amino alcohol portion by portion after reaction of one portion over a given reaction time.

The metal element species used to provide a corresponding metal oxide include alkali metals, alkaline earth metals, lanthanide metals, and transition elements and may be any types capable of being dissolved in water in an ionic state. More particularly, it is preferred to use, as a metal species, Ce, Zr, Ti, Fe, Al, In, Ca Mg, Mn, Co, Ni, La, Cu and the like. The use of such metals leads to the preparation of metal oxide particles such as $CeO_2$, $ZrO_2$, $TiO_2$, $Fe_2O_3$, $Al_2O_3$, $In_2O_3$, $CaO$, $MgO$, $MnO_2$, $CoO$, $NiO$, $La_2O_3$ or solid-solution oxide particles of two or more of the above-indicated oxides.

A single metal oxide can be prepared by dissolving a single metal compound in water, and if two or more metal compounds are dissolved in water, a solid solution or mixture of two or more metal oxides can be prepared. In the latter case, if the respective metal compounds are used at predetermined molar equivalents, the resulting solid solution or mixture having a corresponding oxide composition can be prepared.

It will be noted that although transition metals may take several ion valences, they are likely to take a most stable valence in most cases or the valence of a metal ion derived from a starting material may become predominant.

The starting materials or compounds capable of yielding a metal ion on dissolution in water may be those capable of being dissolving in water and preferably include nitrates, hydroxides, chloride, sulfates and the like.

The starting material is dissolved in water preferably at a concentration of several to several tens of wt % based on water for realizing smooth reaction with an amino alcohol although the concentration may vary in respective stages of reaction within the above range.

The amino alcohol is used as a co-precipitating agent and is not critical in type so far as it can be dissolved in water. Preferable amino alcohols include monoethanolamine, diethanolamine, triethanolamine, monopropanolamine, dipropanolamine, tripropanolamine and the like in view of solubility and viscosity thereof. The amino alcohol is added to a reaction solution as it is. It will be noted that amino alcohols are necessary for converting metal ions into metal oxides. The amino alcohol is used in an amount equal to or greater than a molar equivalent of the metal ion totally used for the reaction. More particularly, the amino alcohol is used at a molar equivalent ratio of 1 to 2:1 relative to a metal ion. Moreover, the time intervals between the respective stages of reaction is preferably constant although varying time intervals may be used. In addition, this time interval is preferably one required for conversion of a metal ion to a corresponding hydroxide.

The detailed mechanism of preparing metal oxide particles whose primary size is on the order of nanometers when using an amino alcohol is used as a co-precipitant is not known at this stage, but we consider that the preparation is based on the following two aspects.

1) The formation speed of a hydroxide ion is appropriate when an amino alcohol is added to an aqueous solution of a metal ion.

Compounds capable of yielding a hydroxide ion when added to the aqueous solution include, aside from amino alcohols, ammonia and metal hydroxides such as NaOH. With ammonia, however, a local exhaust apparatus therefor is necessary and the reaction speed of ammonia is so high that the resulting crystal particles become great in size, making it difficult to prepare particles on the order of nanometers. On the other hand, with a metal hydroxide such as NaOH, separation of the metal ion such as Na ion or the like is difficult. If the resulting particles are calcined, there arises a problem that a metal component of the metal hydroxide is left therein. In contrast thereto, with amino alcohols, impurities can be readily removed such as by centrifugal separation, calcination or the like after formation of metal oxide particles.

2) Because the resulting metal oxide particles are individually covered with an amino alcohol on the surfaces thereof, the amino group of the amino alcohol functions as a dispersant for the particles. Thus, it is assumed that the primary particles of the resulting metal oxide are appropriately suppressed from coagulation or aggregation. In this connection, we have experimentally confirmed from the results of GC-MS (Gas Chromatography-Mass Spectrometer) analyses that the metal oxide surfaces formed in the reaction solution are covered with an employed amino alcohol.

Where a water-soluble amine is added to an aqueous solution of a metal ion, it is preferred that the pH of the aqueous solution is adjusted to a level of not lower than 8 after the addition of the amine. This is for the reason that if the pH of the reaction solution is lower than 8, a hydroxide ion concentration becomes so low that metal oxide particles are unlikely to be formed. This has been confirmed experimentally by us.

When a metal ion is repeatedly charged into the reaction solution after addition of an amino alcohol, a second portion of a metal ion is charged after a lapse of a given time after the addition of the amino alcohol to the first portion of the metal ion in the form of an aqueous solution, followed by further reaction between the amino alcohol and the second portion of the metal ion preferably for the given time as indicated above. If it is intended to carry out a still further reaction, another portion of a metal ion is added to the reaction solution and the reaction is preferably continued over the given time. In this way, individual portions of a metal ion are charged into the aqueous or reaction solution of the amino alcohol at given time intervals although the respective time intervals may be appropriately changed within a range defined before. If a series of the reactions are carried out substantially the same time intervals, control of a primary size obtained during the reactions becomes easy as will be particularly apparent from the examples appearing hereinafter.

According to the method of the invention, metal oxide particles prepared have a primary size ranging from 10 to 50 nanometers, preferably from 10 to 25 nanometers. If no repetition of the reaction is made, the resulting particles have, at most, a primary size of not greater than 5 nanometers.

Unlike this embodiment, if there is used a method wherein a metal ion and an amino alcohol are reacted at one time to provide metal oxide particles, the reaction between the metal ion and the amino alcohol proceeds quickly to provide metal oxide particles. If the amounts of the metal ion and the amino alcohol are changed, only the number of metal oxide particles being formed is changed and no control of the size of the metal oxide particles is possible. In this method, the metal oxide particles have a primary size of not greater than 5 nanometers.

In contrast, according to this embodiment of the invention, an metal ion and an amino alcohol are subjected to a series of reaction stages at given time intervals while one of the reactants is reduced in amount in each reaction stage to half, one third, one fourth or the like of a predetermined amount until the one reactant is totally used up. A lapse of a given time after the initial stage of reaction wherein the metal ion is converted to a corresponding metal hydroxide, a second portion of the one reactant is reacted with the other wherein the metal oxide particles formed in the initial stage of reaction are provided as "seed particles" and the seed particles are grown in a next stage of the reaction. In this way, when compared with the case where only one reaction between a metal ion and amino alcohol is carried out, there can be obtained metal oxide particles having a larger primary size.

Depending on the number of charges of a metal ion or an amino alcohol or the number of repetitions of reaction between a metal ion and an amino alcohol, a desired primary particle size can be arbitrarily obtained as will be particularly seen from examples appearing hereinafter. When the two stages of reaction is carried out, the primary particle size is usually in the range of 10 nm or over. The primary particle size is in the range of 10 to 15 nm for three stages and 15 to 50 nm for four or more stages. Of course, the primary particle size may vary, more or less, depending on the types of metal ion and amino alcohol used and the reaction time intervals.

When the metal oxide particles formed in the reaction solution are separated therefrom and washed with water, centrifugal separation may be used although other separation and washing means such as filtration may be used. This permits impurities incorporated in the reaction solution to be removed. Such impurities include anions, such as a nitrate ion, a chloride ion or the like, derived from a starting material and organic matters derived from the amino alcohol.

The metal oxide particles obtained after washing may be further treated depending on the purpose in end use. If, for example, metal oxide particles are used as a dry powder, metal oxide particles obtained after a final stage of reaction is dried and calcined under conditions of a temperature of from 600 to 800° C. and a time of 1 to 10 hours. When the metal oxide particles are used as a paste, the particles obtained after washing is re-dispersed in water. For the re-dispersion, the resulting dispersion is adjusted in pH to 1 to 4, for example, by addition of an acid such as nitric acid, hydrochloric acid or the like, followed by irradiation with ultrasonic waves. By this, the metal oxide particles can be more effectively re-dispersed.

In the foregoing embodiment, a metal ion is charged at given time intervals into the other portion by portion, which portion depends on the number of reaction stages. In place of the metal ion, an amino alcohol may be initially reacted with a metal ion for a given time at a portion thereof and another portion is subsequently charged into the reaction solution like the metal ion.

In another embodiment of the invention, a metal ion and amino alcohol used as starting materials for the reaction of the invention are initially reacted, at normal temperatures and normal pressure, with each other under conditions of such a mixing ratio of the amino alcohol and the metal ion of 1 to 2:1 in terms of molar equivalent and a given time as defined before, after which similar amounts of a metal ion and an amino alcohol as used in the initial stage are at least once charged into the resulting reaction solution for further reaction under similar conditions as in the initial reaction. This manner of reaction leads to similar results as in the first embodiment.

The invention is more particularly described by way of examples. Comparative examples are also shown.

EXAMPLE 1

11.25 g of aluminium nitrate used as a starting material for metal oxide was dissolved in 170 g of water in a beaker. While agitating this aqueous solution with a stirrer, 80 ml of diethanolamine was added, followed by agitation for 24 hours with the stirrer. The pH of the aqueous solution after the addition of diethanolamine was found to be 9. Thereafter, a procedure of charging an aqueous solution of 11.25 g of aluminium nitrate in 100 ml of water into the reaction solution and agitating for 24 hours with a stirrer was repeated three times in total to obtain a product in the reaction solution. Thereafter, the reaction solution was subjected to centrifugal separation to separate the product therefrom, followed by washing three times with water and dried at a temperature of 90° C. to obtain metal oxide particles on the order of nanometers as indicated in the table appearing hereinafter.

In this way, according to this example, after the initial reaction between the metal ion and the amino alcohol, the metal ion in the form of an aqueous solution was repeatedly charged into the reaction solution at the certain time intervals three times in total. The ethanolamine used in the example corresponded to 2 molar equivalents relative to the total moles of the aluminium ion. The reaction time intervals of 24 hours were used between the repeated reactions.

EXAMPLE 2

The general procedure of Example 1 was repeated except that the procedure of charging 11.25 g of aluminium nitrate dissolved in 100 ml of water into the reaction solution and agitating the reaction solution with a stirrer for 24 hours was repeated while changing the number of repetitions from three to two. In this case, the molar equivalent of diethanolamine was at 1 relative to the total moles of the aluminium ion.

EXAMPLE 3

The general procedure of Example 1 was repeated except that the procedure of charging 11.25 g of aluminium nitrate dissolved in 100 ml of water into the reaction solution and agitating the reaction solution with a stirrer for 24 hours was repeated while changing the number of repetitions from three to one. The molar equivalent of diethanolamine was at 1 relative to the total moles of the aluminium ion.

COMPARATIVE EXAMPLE 1

Comparative Example 1 was carried out for comparison with Examples 1 to 3. More particularly, the general procedure of Example 1 was repeated except that the procedure of charging 11.25 g of aluminium nitrate dissolved in 100 ml of water into the reaction solution and agitating the reaction solution with a stirrer for 24 hours was omitted.

EXAMPLE 4

The general procedure of Example 1 was repeated except that the amount of diethanolamine was changed from 80 ml to 40 ml.

EXAMPLE 5

The general procedure of Example 1 was repeated except that monoethanolamine was used in place of diethanolamine.

COMPARATIVE EXAMPLE 2

Comparative Example 2 was carried out for comparison with Example 5. More particularly, the general procedure of Comparative Example 1 was repeated except that monoethanolamine was used in place of diethanolamine.

EXAMPLE 6

The general procedure of Example 1 was repeated except that triethanolamine was used in place of diethanolamine.

COMPARATIVE EXAMPLE 3

Comparative Example 3 was carried out for comparison with Example 6. More particularly, the general procedure of Comparative Example 1 was repeated except that triethanolamine was used in place of diethanolamine.

EXAMPLE 7

The general procedure of Example 1 was repeated except that zirconium oxynitrate was used in place of aluminium nitrate.

COMPARATIVE EXAMPLE 4

Comparative Example 4 was carried out for comparison with Example 7. More particularly, the general procedure of Comparative Example 1 was repeated except that zirconium oxynitrate was used in place of aluminium nitrate.

EXAMPLE 8

The general procedure of Example 1 was repeated except that cerium nitrate and zirconium oxynitrate mixed at a molar ratio of 5:5 were used in place of aluminium nitrate.

COMPARATIVE EXAMPLE 5

Comparative Example 5 was carried out for comparison with Example 8. More particularly, the general procedure of Comparative Example 1 was repeated except that cerium nitrate and zirconium oxynitrate mixed at a molar ratio of 5:5 were used in place of aluminium nitrate.

EXAMPLE 9

The general procedure of Example 1 was repeated except that cerium nitrate and zirconium oxynitrate mixed at a molar ratio of 3:7 were used in place of aluminium nitrate.

COMPARATIVE EXAMPLE 6

Comparative Example 6 was carried out for comparison with Example 9. More particularly, the general procedure of Comparative Example 1 was repeated except that cerium nitrate and zirconium oxynitrate mixed at a molar ratio of 3:7 were used in place of aluminium nitrate.

EXAMPLE 10

The general procedure of Example 1 was repeated except that cerium nitrate and zirconium oxynitrate mixed at a molar ratio of 7:3 were used in place of aluminium nitrate.

COMPARATIVE EXAMPLE 7

Comparative Example 7 was carried out for comparison with Example 10. More particularly, the general procedure of Comparative Example 1 was repeated except that cerium nitrate and zirconium oxynitrate mixed at a molar ratio of 7:3 were used in place of aluminium nitrate.

EXAMPLE 11

The general procedure of Example 1 was repeated except that ferric nitrate was used in place of aluminium nitrate.

COMPARATIVE EXAMPLE 8

Comparative Example 8 was carried out for comparison with Example 11. More particularly, the general procedure of Comparative Example 1 was repeated except that ferric nitrate was used in place of aluminium nitrate.

EXAMPLE 12

The general procedure of Example 1 was repeated except that indium nitrate was used in place of aluminium nitrate.

COMPARATIVE EXAMPLE 9

Comparative Example 9 was carried out for comparison with Example 12. More particularly, the general procedure of Comparative Example 1 was repeated except that indium nitrate was used in place of aluminium nitrate.

EXAMPLE 13

The general procedure of Example 1 was repeated except that titanium nitrate was used in place of aluminium nitrate.

COMPARATIVE EXAMPLE 10

Comparative Example 10 was carried out for comparison with Example 13. More particularly, the general procedure of Comparative Example 1 was repeated except that titanium nitrate was used in place of aluminium nitrate.

EXAMPLE 14

The general procedure of Example 1 was repeated except that cerium nitrate was used in place of aluminium nitrate.

COMPARATIVE EXAMPLE 11

Comparative Example 11 was carried out for comparison with Example 14. More particularly, the general procedure of Comparative Example 1 was repeated except that cerium nitrate was used in place of aluminium nitrate.

The results of analyses of the metal oxides obtained in the above examples and comparative examples are shown in the following table. In the table, there are shown yields of the respective metal oxides determined by an ordinary calculation method, primary particle sizes through TEM (transmission electron microscopy) observation, metal elements detected by measurement with XRF (X-ray fluorescence analysis), and identification of crystals by XRD (X-ray diffraction) measurement.

TABLE

|  | Yield | Primary particle size measured with TEM | Metal element detected by XRF | XRD pattern |
|---|---|---|---|---|
| Example 1 | >90% | 15-20 nm | Al | $Al_2O_3$ |
| Example 2 | >90% | 10-15 nm | Al | $Al_2O_3$ |
| Example 3 | >90% | 10 nm | Al | $Al_2O_3$ |
| Comparative Example 1 | >90% | 5 nm | Al | $Al_2O_3$ |
| Example 4 | >90% | 20 nm | Al | $Al_2O_3$ |
| Example 5 | >90% | 20 nm | Al | $Al_2O_3$ |
| Comparative Example 2 | >90% | 5 nm | Al | $Al_2O_3$ |
| Example 6 | >90% | 20 nm | Al | $Al_2O_3$ |
| Comparative Example 3 | >90% | 5 nm | Al | $Al_2O_3$ |
| Example 7 | >90% | 20 nm | Zr | $ZrO_2$ |
| Comparative Example 4 | >90% | 4 nm | Zr | $ZrO_2$ |
| Example 8 | >90% | 15-20 nm | Ce(46)Zr(56) | $CeO_2ZrO_2$ solid solution |
| Comparative Example 5 | >90% | 3-4 nm | Ce(46)Zr(56) | $CeO_2ZrO_2$ solid solution |
| Example 9 | >90% | 20 nm | Ce(28)Zr(72) | $CeO_2ZrO_2$ solid solution |
| Comparative Example 6 | >90% | 4 nm | Ce(28)Zr(72) | $CeO_2ZrO_2$ solid solution |
| Example 10 | >90% | 15 nm | Ce(63)Zr(37) | $CeO_2ZrO_2$ solid solution |
| Comparative Example 7 | >90% | 3 nm | Ce(63)Zr(37) | $CeO_2ZrO_2$ solid solution |
| Example 11 | >90% | 25 nm | Fe | $Fe_2O_3$ |
| Example 8 | >90% | 5 nm | Fe | $Fe_2O_3$ |
| Example 12 | >90% | 25 nm | In | $In_2O_3$ |

TABLE-continued

| | Yield | Primary particle size measured with TEM | Metal element detected by XRF | XRD pattern |
|---|---|---|---|---|
| Comparative Example 9 | >90% | 5 nm | In | $In_2O_3$ |
| Example 13 | >90% | 20 nm | Ti | $TiO_2$ |
| Comparative Example 10 | >90% | 4 nm | Ti | $TiO_2$ |
| Example 14 | >90% | 15-20 nm | Ce | $CeO_2$ |
| Comparative Example 11 | >90% | 3-4 nm | Ce | $CeO_2$ |

In any of Examples 1 to 3 and Comparative Example 1 wherein the metal ion was charged into the reaction solution at different times after the first stage of reaction between the metal ion and the diethanolamine, Al metal was detected when measured with XRF and it was confirmed that the crystal patterns obtained by measurement with XRD were derived from $Al_2O_3$. It will be noted that the XRD patterns had a broad peak, which is considered for the influence of the particles on the order of nanometers or due to incomplete crystallization.

As a result of measurement of a primary particle size of the metal oxides through observation with TEM, it was found that the primary size ranges from 15 to 20 nm for Example 1 and from 10 to 15 nm for Example 2, and is at 10 nm for Example 3 and is at about 5 nm for Comparative Example 1. It has been confirmed that as the number of charges of the metal ion into the reaction solution after the first stage of reaction between the metal ion and diethanolamine becomes greater, the primary size of the resulting metal oxide becomes greater. More particularly, if a metal ion is charged at least once into a reaction solution after reaction between the portion of the metal ion and the amino alcohol, there could be obtained metal oxide particles with a desired primary particle size on the order of nanometers, which varies depending on the number of the charges, or increases depending on the increasing number of the charges.

From the comparison between Example 5 and Comparative Example 2, it was confirmed that like Example 1, Al metal was detected by measurement with XRF and the crystal patterns obtained by measurement with XRD were derived from $Al_2O_3$. The measurement of a primary particle size through TEM observation revealed that the size was about 20 nm for Example 5 and 5 nm for Comparative Example 2. From this, it was confirmed that when monoethanolamine was used as an amino alcohol and a further portion of the metal ion was charged into the reaction solution after the reaction between the first portion of the metal ion and the monoethanolamine, the resulting metal oxide particles became greater in size within a range of nanometers than those obtained by only one reaction between the metal ion and the monoethanolamine in the comparative example.

The comparison between Example 7 and Comparative Example 4 revealed that Zr metal was detected by measurement with XRF and the crystal patterns obtained by measurement with XRD were derived from $ZrO_2$. The results of measurement of a primary particle size through TEM observation revealed that the size was about 20 nm for Example 7 and 4 nm for comparative Example 4. From the above results, it will be seen that with the case of $ZrO_2$ prepared as metal oxide particles, when a further portion of Zr ion is charged into the reaction solution after reaction between the portion of Zr ion and the amino alcohol, the resulting Zr oxide particles have a primary size larger than those obtained by only one reaction between the Zr ion and the amino alcohol within a range of nanometers, like Example 1.

In Examples 8 to 10, $CeO_2/ZrO_2$ solid solutions were prepared while changing compositional ratios of the metals. In all cases, it was confirmed by measurement with XRF that the resulting particles could be prepared as having compositional ratios close to the respective initial ratios of starting materials. According to the measurement with XRD, a single oxide peak was not detected but only peaks derived from the solid solutions were detected, from which it was confirmed that particles having intended compositions were prepared, respectively. Moreover, when measured with TEM, the primary particles of the solid solutions obtained in Examples 8 to 10 were, respectively, greater in size than those of corresponding particles in Comparative Examples 5 to 7. Thus, it was confirmed that like Example 1, where $CeO_2/ZrO_2$ solid solutions were prepared by charging another portion of the metal ions into the reaction solution obtained after reaction between the portions of the metal ions and the amino alcohol, the primary sizes of the resulting oxide particles were greater, within a range of nanometers, than those of the particles obtained by only one reaction between the metal ions and the amino alcohol, respectively.

The comparison between Example 11 and Comparative Example 8 revealed that the Fe metal was detected by measurement with XRF and the crystal patterns obtained by measurement with XRD were derived from $Fe_2O_3$. The results of measurement of a primary particle size through TEM observation revealed that the size was about 25 nm for Example 11 and 5 nm for Comparative Example 8. From this, it was confirmed that like Example 1, when a further portion of the Fe ion was charged into the reaction solution after reaction between the portion of the Fe ion and the amino alcohol, the resulting iron oxide particles had a primary size greater than those obtained by only one reaction between the Fe ion and the amino alcohol within a range of nanometers.

The comparison between Example 12 and Comparative Example 9 revealed that In metal was detected by measurement with XRF and the crystal patterns obtained by measurement with XRD were derived from $In_2O_3$. Moreover, the results of measurement of a primary particle size through TEM observation revealed that the primary size was about 25 nm for Example 12 and 5 nm for Comparative Example 9. With the case of the preparation of $In_2O_3$, it was also confirmed that when another portion of the metal ion was charged into the reaction solution obtained after reaction between the first portion of the metal ion and the amino alcohol, the resulting metal oxide particles were greater in primary size, within a range of nanometers, than those obtained by only one reaction between the metal ion and the amino alcohol.

The comparison between Example 13 and Comparative Example 10 revealed that the Ti metal was detected when measured with XRF and the crystal patterns obtained by measurement with XRD were, respectively, derived from $TiO_2$. It was also confirmed that the primary particle size measured through TEM observation was at about 20 nm for Example 13 and 4 nm for Comparative Example 10. With the case of the preparation of $TiO_2$, it was also confirmed that like Example 1, when another portion of the metal ion was further charged in the subsequent stage into the reaction solution obtained after the reaction between the titanium ion and the amino alcohol, the resulting titanium oxide particles became greater in primary size within a range of nanometers than those obtained by only one reaction between the titanium ion and the amino alcohol.

The comparison between Example 14 and Comparative Example 11 revealed that the Ce metal was detected when measured with XRF and the crystal patterns obtained by measurement with XRD were, respectively, derived from $CeO_2$. It was also confirmed that the primary particle size measured through TEM observation was at about 15 to 20 nm for Example 13 and 3 to 4 nm for Comparative Example 10. With the case of the preparation of $CeO_2$, it was also confirmed that like Example 1, when another portion of the metal ion was further charged in the subsequent stage into the reaction solution obtained after the reaction between the cerium ion and the amino alcohol, the resulting cerium oxide particles became greater in primary size within a range of nanometers than those obtained by only one reaction between the cerium ion and the amino alcohol.

In all the examples, the yields are relatively good and the respective metal oxide particles with a primary particle size ranging from 10 to 25 nanometers can be arbitrarily obtained under normal temperature and normal pressure conditions.

From the above results, it will be seen that metal oxide particles on the order of nanometers can be prepared without resorting to conventional high temperature calcination. Moreover, when a metal ion is repeatedly charged into the reaction solution obtained by reaction between a metal ion and an amino alcohol after given time intervals allowing the reaction between the charged metal ion and the amino alcohol, there can be obtained metal oxide particles having a desired primary size depending on the number of repetitions.

Although, in the above examples, the given time intervals were set at 24 hours, a time interval of not shorter than 5 hours is sufficient for the reaction. As defined before, the time intervals may be within a range of from 5 to 48 hours.

EXAMPLE 15

45 g of aluminium nitrate was dissolved in 170 ml of water in a beaker. While agitating this aqueous solution with an stirrer, 20 ml of diethanolamine was added to the aqueous solution and agitated with the stirrer for 24 hours. Thereafter, 20 ml of diethanolamine was charged into the reaction solution and the reaction solution was agitated with the stirrer for 24 hours, followed by repeating the charging and agitating steps three times in total to obtain a product in the aqueous solution. The product was separated by centrifugal separation, washed with water three times and dried to obtain metal oxide particles.

The particles were subjected to similar measurements as in Example 1 with similar results.

EXAMPLE 16

11.25 g of aluminium nitrate was dissolved in 170 ml of water in a beaker. While agitating this aqueous solution with an stirrer, 20 ml of diethanolamine was added to the aqueous solution and agitated with the stirrer for 24 hours. This procedure was repeated three times in total, followed by separating the product by centrifugal separation, washing with water three times and drying to obtain metal oxide particles. The particles were subjected to similar measurements with similar results as in Example 1.

What is claimed is:

1. A method for preparing metal oxide particles having a primary particle size on the order of nanometers, the method comprising an initial stage of reaction wherein a portion of a metal ion present in an aqueous solution thereof and an amino alcohol are reacted with each other at an ambient temperature under atmospheric pressure for a given time of 5-48 hours at a pH of the resulting reaction solution adjusted to 8 or over thereby forming seed particles, and a subsequent stage of reaction after the initial stage wherein a remaining portion of the metal ion is added to the reaction solution to provide metal oxide particles having a primary size ranging from 10 to 50 nanometers, total amount of the metal ion and the amino alcohol being such that the amino alcohol is used in the range of not less than a molar equivalent to the metal ion.

2. The method according to claim 1, wherein during the subsequent stage of reaction, the metal iron converts into a corresponding metal hydroxide.

3. The method according to claim 1, wherein the total amount of the amino alcohol is divided into several portions corresponding to the intended number of reaction stages and a first portion of the amino alcohol is used for the initial stage of reaction relative to the total amount of the metal ion thereby forming seed particles and the remaining portions are added to the respective reaction stages.

4. The method according to claim 1, wherein the remaining portion of the metal ion is further divided to carry out two, three or four further stages of reaction with the amino alcohol.

5. A method for preparing metal oxide particles having a primary particle size on the order of nanometers, the method comprising providing a metal ion present in an aqueous solution and an amino alcohol, respectively, dividing the metal ion and the amino alcohol into several portions corresponding to an intended number of reaction stages, creating a reaction solution by combining a first portion of the metal ion and a first portion of the amino alcohol to in initial stage of reaction at an ambient temperature under atmospheric pressure for a given time to form seed particles, and combining remaining portions of the metal ion and the amino alcohol to subsequent stages of reaction, wherein, in each stage of reaction, a portion of the amino alcohol and a portion of the metal ion are added to the reaction solution, and wherein total amounts of the metal ion and the amino alcohol are such that the amino alcohol is used in the range of not less than a molar equivalent to the metal ion whereby metal oxide particles on the order of nanometers are obtained after drying.

* * * * *

UNITED STATES PATENT AND TRADEMARK OFFICE
CERTIFICATE OF CORRECTION

| | | |
|---|---|---|
| PATENT NO. | : 7,922,994 B2 | Page 1 of 1 |
| APPLICATION NO. | : 12/317047 | |
| DATED | : April 12, 2011 | |
| INVENTOR(S) | : Hiroaki Yotou et al. | |

It is certified that error appears in the above-identified patent and that said Letters Patent is hereby corrected as shown below:

Col. 14, line 48, Claim 5, delete "to"

Col. 14, line 51, Claim 5, delete "to" and replace with --in--

Signed and Sealed this
Twenty-ninth Day of November, 2011

David J. Kappos
*Director of the United States Patent and Trademark Office*